United States Patent [19]

Tanaka

[11] 4,108,264
[45] Aug. 22, 1978

[54] CABLE TAKE-UP DEVICE FOR ELECTRIC DRIVE VEHICLE

[75] Inventor: Yujiro Tanaka, Hiratsuka, Japan

[73] Assignee: Kabushiki Kaisha Komatsu Seisakusho, Japan

[21] Appl. No.: 752,595

[22] Filed: Dec. 20, 1976

[30] Foreign Application Priority Data

Dec. 29, 1975 [JP] Japan ................................ 50-157702

[51] Int. Cl.$^2$ .............................................. B60L 9/04
[52] U.S. Cl. ............................... 180/2 R; 191/12.2 A; 242/86.51; 254/166; 254/173 R
[58] Field of Search ......... 180/2; 191/12.2 R, 12.2 A; 242/86.8, 86.51; 254/166, 173 R, 173 B

[56] References Cited

U.S. PATENT DOCUMENTS

| | | | |
|---|---|---|---|
| 3,168,261 | 2/1965 | Hainer | 242/86.51 |
| 3,632,906 | 1/1972 | Aihara | 191/12.2 A |
| 3,861,505 | 1/1975 | Sugimura | 191/12.2 R |
| 3,943,306 | 3/1976 | Aihara | 191/12.2 R |

*Primary Examiner*—John A. Pekar
*Attorney, Agent, or Firm*—Ladas, Parry, Von Gehr, Goldsmith & Deschamps

[57] ABSTRACT

A cable take-up device mounted at the rear of an electric drive vehicle for winding and unwinding a feeder cable. The device controls a winding angle of the take-up cable so as to maintan it constant. A slack angle of the cable is an angle made between a line drawn along the cable in the vicinity of a winding point and a plane including the winding point and being perpendicular to an absolute plane. According to the invention, this slack angle is controlled so as to provide an optimum tension constantly regardless of forward or reverse running speed change or steering of the vehicle.

7 Claims, 13 Drawing Figures

CABLE TAKE-UP DEVICE FOR ELECTRIC DRIVE VEHICLE

BACKGROUND OF THE INVENTION

This invention relates to a cable take-up device for an electric drive vehicle. There have recently been conducted mechanizations and eliminations or reductions of labor in civil works and in loading and unloading operations, etc. Particularly in a case wherein there is likelihood of causing undesirable problems in the working environment such as air pollution, noise, etc. as in underground digging work in a tunnel or mine, below-deck operations in a vessel, indoor work, etc., an electric drive vehicle is broadly adapted to obviate these problems.

Since such an electric drive vehicle consumes great power in doing the aforementioned work, it does not use a charging system but directly employs a commercial power supply in order to eliminate loss in the operation time of the vehicle caused by battery charging and thereby to improve its working efficiency and to reduce the working cost. Therefore, as this vehicle uses a system which directly connects a feeder cable to the power supply, it becomes a very important problem to properly handle this feeder cable so as to enhance its working efficiency.

This invention contemplates obviating the above described disadvantages of the conventional electric drive vehicle and to efficiently solve the problem of handling the feeder cable connected to the electric drive vehicle. To this end, its mounts a cable take-up device at the rear of the vehicle, always controls a winding angle of the cable constant with respect to a plane perpendicular to the horizontal or absolute plane in the longitudinally axial direction of the vehicle of the cable take up onto the cable take-up device, removes abnormal tension, bending or twisting of the cable under any condition such as in forward or reverse running and speed change and steering controls, etc. of the vehicle, prevents the deterioration of strength and breaking of the cable and, in addition, prevents damage to the cable due to being run over by the vehicle or due to slackness and overlapping of the cable as it is taken up onto the cable take-up device owing to the excessive looseness of the cable, and performs safe and efficient operation of the vehicle.

There has been was disclosed U.S. Pat. No. 3,861,505 a system which adds a constant torque always to a cable take-up drum of an electric drive vehicle and which cannot consequently keep the rotation of the take-up drum current with the operations of the vehicle at abrupt acceleration and deceleration of the vehicle with the result that excessive tension is added to the cable to cause the cable to be broken or to be excessively slackened resulting in looseness and overlapping of the cable on the taken-up drum. Further, as the torque motor always consumes electric power for adding a torque to the cable, the motor must be of a large type and requires a blower for cooling itself.

SUMMARY OF THE INVENTION

Accordingly, it is an object of this invention to provide a cable take-up device for an electric drive vehicle which can always control a slack angle of a cable taken up onto the cable take-up drum of the cable take-up device.

It is another object of this invention to provide a cable take-up device for an electric drive vehicle which can properly control a slack angle in response to the speed change gear shifting of the vehicle.

It is still another object of this invention to provide a cable take-up device for an electric drive vehicle which can control a slack angle in response to the steering operations of the vehicle.

Still another object of this invention is to provide a cable take-up device for an electric drive vehicle with a cable shifting device at the cable take-up port of a cable take-up drum of the cable take-up device so as to orderly wind up the cable and also to form a plurality of overlapping windings of the cable in order to make the drum compact.

Still another object of this invention is to provide a cable take-up device for an electric drive vehicle which employs a motor for rotating the cable take-up drum having two opposite series windings in polarity so as to improve the torque characteristics of the motor in normal and reverse rotations.

Yet another object of this invention is to provide a cable take-up device for an electric drive vehicle which can detect the inclination of the vehicle in the longitudinal direction of the vehicle to correct the set value of a slack angle of the cable by the detected signal therefrom in order to always maintain the tension of the cable constant.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
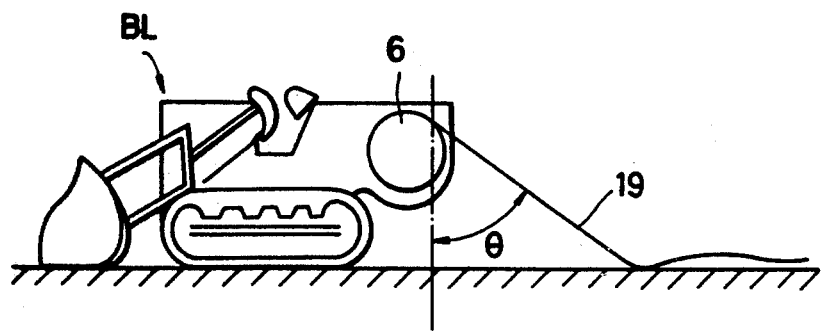
FIG. 1 is a side view of an electric drive vehicle equipped with a cable take-up device according to the present invention.

FIG. 1 shows an electric drive bulldozer BL equipped with this invention. As shown, a cable 19 is wound on and unwound from a cable take-up drum 6 and is so controlled as to keep an angle $\theta$ thereof formed from the vertical direction substantially constant. A control device for controlling the angle $\theta$ of the cable 19 will now be described with reference to FIG. 2, which shows a block diagram of one embodiment of the control device of this invention for controlling the angle θ of the cable 19 substantially constant. The control device has an AC power supply 1, the AC voltage of which, such as, for example, AC 400 volts, is supplied through the cable 19 (FIG. 1) taken up on the drum 6. This AC voltage is applied to the primary winding of a transformer 2, which is provided for transforming the AC 400-volt voltage to a proper desired voltage. The transformed voltage of the output of the secondary winding of the transformer 2 is applied through a line 3 to a control rectifier 4. This control rectifier 4 is, for example, composed of a circuit including a thyristor and is provided for supplying a DC current for driving a DC motor 5 so as to rotate the drum 6. The control device also has a cable slack angle detector 7 which is provided for detecting the angle θ of the cable 19 formed from the vertical direction as shown in FIG. 1. A signal representing the detected angle θ of the cable 19 from the detector 7 is applied to one input of an ignition control circuit 8.

A signal representing a set slack angle from a slack angle setting device 9 is delivered to a second input of the ignition control circuit 8, thereby controlling the ignition of the thyristor in the control rectifying circuit 4 in accordance with the deviation between the detected slack angle θ of the cable 19 and the set slack angle from the slack angle setting device 9 and thereby controlling the rotating speed and direction of the DC motor 5 so as to bring the angle θ of the cable 19 with respect to the vertical direction into coincidence with the set slack angle.

Figure 2:
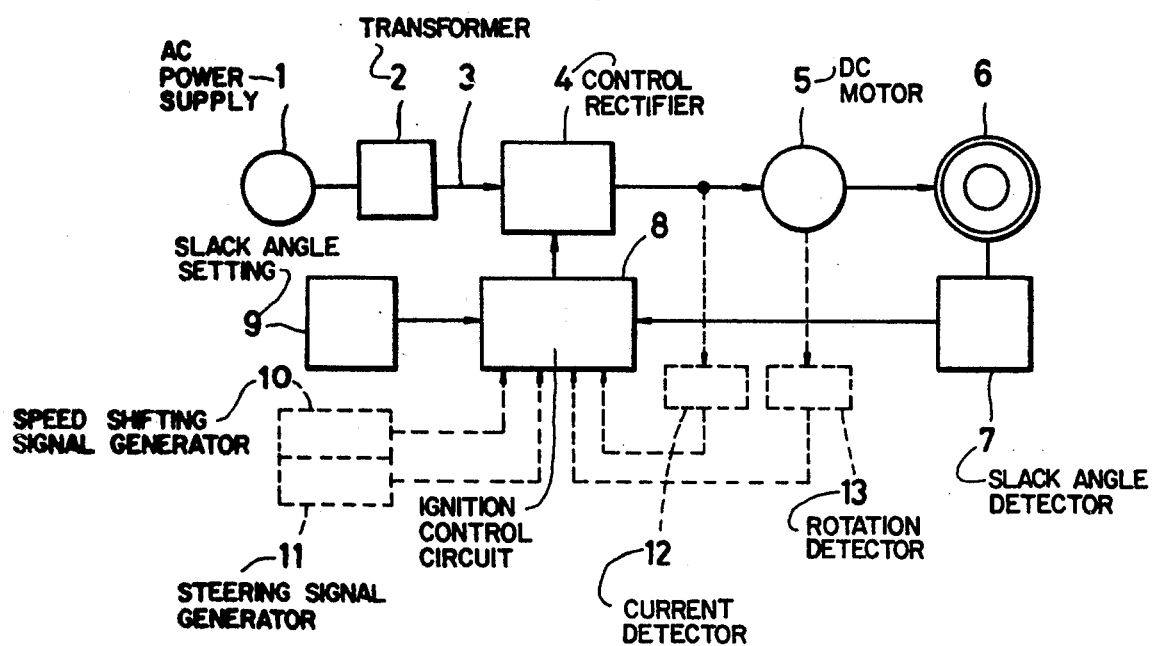
FIG. 2 is a block diagram showing one embodiment of a control device of this invention.

This control device also has an auxiliary control circuit as designated by broken lines in FIG. 2. This auxiliary control circuit has a speed shifting signal generator 10 which is constructed to generate a speed shifting or change signal varying in response to the speed change gear shifting of the vehicle, a steering signal generator 11 which is provided to generate a steering signal varying in response to the rightward or leftward steering of the vehicle, and current and rotation detectors 12 and 13 which are respectively constructed to generate respective signals when the current applied to and rotating speed of the DC motor become below respective predetermined values and to apply these signals to the ignition control circuit 8 thereby correcting the ignition angle of the thyristor of the control rectifier 4.

Figure 3:
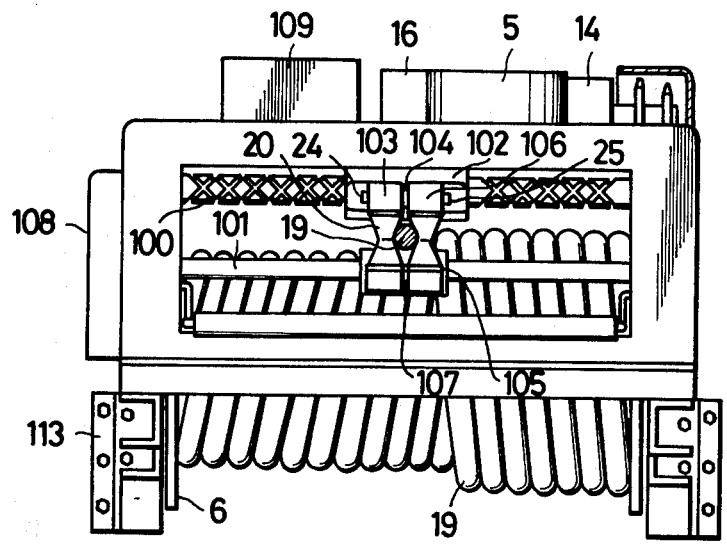
FIGS. 3 and 4 are front and side views of one embodiment of a motor, drum and transmission system of this invention.
Figure 4:
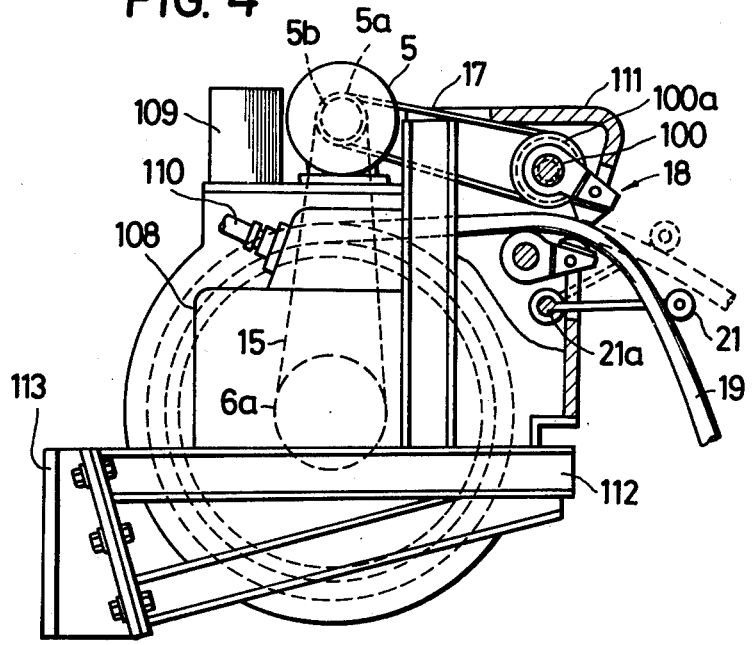

FIGS. 3 and 4 show specific examples of the DC motor 5 and the cable take-up drum 6 together with their transmission system. As shown, a cycloidal reduction gear 14 is disposed at the right side of the DC motor 5 for reducing the rotating speed of the motor 5, and an electromagnetic brake 16 is located at the left side of the motor 5 for locking up the rotation of the motor 5 when a voltage applied from the power supply to the motor 5 is cut off so as to prevent a slackness or looseness of the cable 19 due to the free rotation of the drum 6.

Two stages of chain sprockets 5a and 5b are provided at the output shaft of the motor 5. One sprocket 5a is connected through a chain 15 to a sprocket 6a mounted to the drum shaft of the take-up drum 6 for rotating the drum 6, and the other sprocket 5b is connected through a chain 17 to a sprocket 100a mounted to a shifter screw 100 for rotating the shifter screw 100. Dual special threads are formed on the shifter screw 100, and a shifter or shifting device 18 having guide rollers 20 for guiding the cable 19 is engaged to the dual special threads of the shifter screw 100. The shifter screw 100 is rotated at a rotating speed having a predetermined relation with respect to the rotation of the drum 6 thereby moving the shifter device 18 in rightward or leftward direction in FIG. 3 then guiding the cable 19 with the guide rollers 20 in order to orderly and successively take up the cable 19 onto the drum 6. When the guide rollers 20 reach one stroke end of the shifter 18, the dual special threads of the shifter screw 100 switch the moving direction of the guide rollers 20 in opposite or reverse direction so as to take up the cable 19 in an overlapping manner on the drum.

A guide bar 101 is constructed to guide a bracket 105 so as to aid smooth rectilinear motions of the guide rollers 20 in lateral directions such as in rightward or leftward direction in FIG. 3. Roller holding brackets 103 and 106 are so arranged on the upper and lower brackets 102 and 105 as to slide in lateral directions such as in rightward or leftward direction in FIG. 3 with upper and lower pins 104 and 107 as guides and also to have spring means urging the guide rollers 20 towards one another.

Switches 24 and 25 are arranged at the outside of the brackets 103 and 106, respectively as means for detecting the lateral bendings of the cable 19 in rightward or leftward direction in FIG. 3 caused by the steering operations of the vehicle.

A detecting bar 21 is provided to detect the slack angle θ of the cable 19. A potentiometer 21a is arranged at the fulcrum of the detecting bar 21 for detecting the rotated angle of the detecting bar 21 as it tracks the slack angle of the cable 19 thereby detecting the slack angle of the cable 19 with respect to the vertical direction.

A box 108 contains control units directly connected to the power supply through the cable 19 wound on the cable take-up drum 6 and they apply various control signals through connectors 110 to the respective parts of the vehicle.

The control device also has a transformer cover 109 and a device cover 111, and is supported by drum support trestle 112, which is mounted through a vehicle contact portion 113 to the vehicle body.

Figure 5:
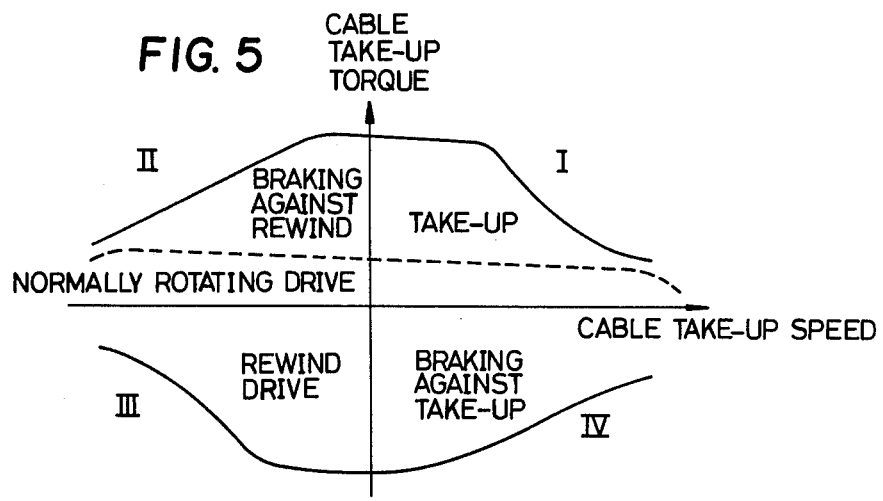
FIG. 5 is a graph showing performance characteristics of the motor depicted in FIGS. 3 and 4.

FIG. 5 shows the characteristics for the control range of the motor 5. The first, second, third and fourth quadrants I, II, III and IV in FIG. 5 illustrate respectively the operational regions of take-up (normally rotating drive), braking against rewind, rewind drive (reversely rotating drive) and braking against take-up of the cable 19. The broken line in FIG. 5 indicates the characteristics of the conventional torque motor. Thus, the operation of the torque motor in the prior art is restricted only to within the first and second quadrants I and II, whereas the operation of the motor 5 of this invention is extended to the third quadrant III in the forward abrupt acceleration of the vehicle and also to the fourth quadrant IV in the reverse abrupt deceleration of the vehicle so as to prevent the generation of abnormal tension of the cable 19.

Figure 6:
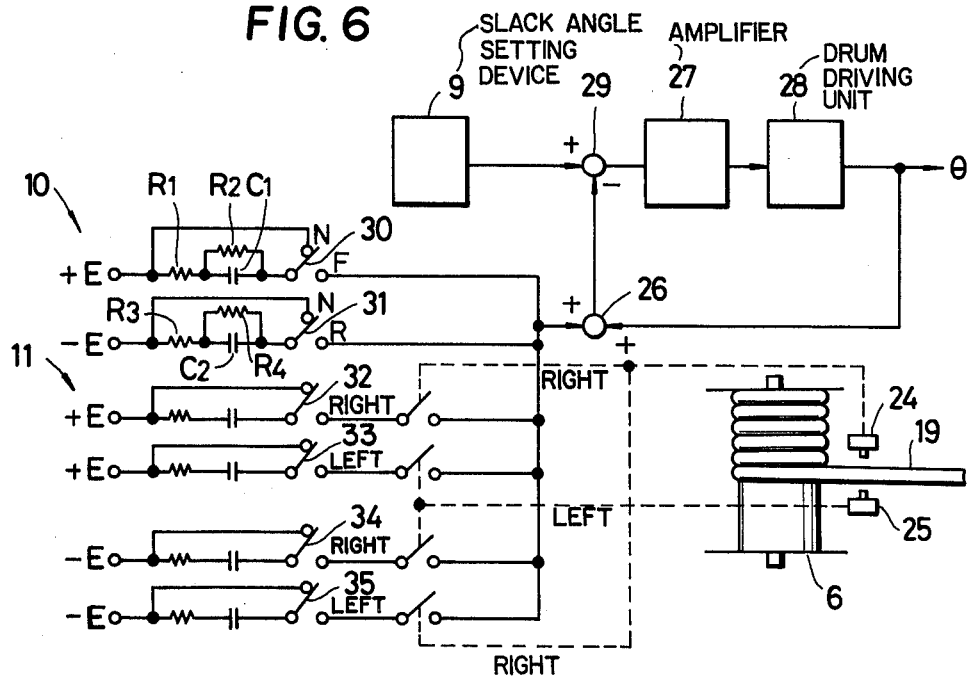
FIG. 6 is a partial detailed circuit diagram of the embodiment shown in FIG. 2.

FIG. 6 shows a detailed circuit diagram of the auxiliary control circuit as shown in FIG. 2. Since the variations of the cable take-up speed become large during starting and steering operations of the vehicle, this auxiliary control circuit will feed back various signals to the control device in addition to the fed back detected angle θ of the cable 19 so as to cause it to respond to the aforementioned variations of the cable take-up speed.

Switches 30 and 31 are interlocked with the speed change gear shift lever. The switch 30 has a terminal F closed at the forward running of the vehicle. The switch 31 has terminal R closed at the reverse running of the vehicle. Switches 32 to 35 are provided to detect the steering operations of the vehicle as interlocked with the steering device of the bulldozer BL.

The cable angle detecting switches 24 and 25 are arranged at both right and left sides of the cable 19 wound on the cable take-up drum 6. The contact of the switch 24 is connected in series with switches 32 and 35, and the contact of the switch 25 is connected in series with switches 33 and 34, as seen by broken lines in FIG. 6. The forward and reverse running and steering detecting signals are added to the signal of the detected angle $\theta$ of the cable 19 at an adding portion 26. The sum or output from the adding portion 26 is subtracted from the output of the slack angle setting device 9 at a subtracting portion 29 to produce a signal representing the deviation therebetween. This deviation signal from the subtracting portion 29 is applied through an amplifier 27 to the input of a drum driving unit 28 so as to rotate the drum 6. This drum driving unit 28 has the ignition control circuit 8, the control rectifier 4, the motor 5, the cable take-up drum 6, etc.

The operation of the first embodiment of the control device of this invention thus constructed will now be described. An optimum desired slack angle is set by the slack angle setting device 9. When the vehicle runs in the forward direction, a tension is produced at the cable 19 so that the slack angle $\theta$ of the cable 19 becomes larger to exceed the set value. Then, the deviation value from the subtracting portion 29 will become negative, so that the motor 5 is reversely rotated by the ignition control signal proportional to the amplitude of the deviation value with the result that the cable take-up drum 6 will rotate in such a direction that the cable 19 is rewound.

On the contrary, when the vehicle runs in the reverse direction, the slack angle $\theta$ of the cable 19 becomes smaller so as to produce a smaller output of the slack angle detector 7, so that the deviation between the slack angle and the set value becomes positive with the result that the motor 5 is rotated in normal direction to take up the cable 19 on the drum 6.

An electric current flowing through the motor 5 is always detected by the current detector 12. When the current exceeds a predetermined value, the thyristor ignition angle is adjusted by means of the ignition control in such a direction that the rotation of the motor 5 is decelerated so as to correct the error caused by the current change of the motor 5. Similarly, the rotating speed of the motor 5 will be also corrected by the rotating speed detector 13.

Since the variation of the rewinding of the cable 19 from the drum 6 is large in a case wherein the vehicle starts to run in the forward direction from a stopped state, the response to the output of the slack angle detector 7 must not be late or slow to cause the cable 19 to be subjected to abnormal tension. In order to obviate this, a positive voltage signal similar to the signal representing a larger slack angle $\theta$ of the cable 19 will be applied to the control device from the speed shifting signal generator 10 at the time when the speed change gear shift lever is shifted from neutral position N to forward running position F. As shown in FIG. 6, this signal is temporarily applied through switch 30 to an adding portion 26 by the series circuit of a resistance $R_1$ and a capacitance $C_1$. A resistance $R_2$ connected in parallel with the capacitance $C_1$ is provided to correct the signal representing the slack angle $\theta$ as if a larger slack angle $\theta$ was steadily detected. Therefore when the vehicle runs in the forward direction, the slack angle of the cable 19 will be so controlled as to be slightly loose. Thus, the drum 6 will be speedily unwound of the cable 19.

As the speed change gear shift lever is shifted from the neutral position N to the reverse running position R when the vehicle runs in the average direction from the stopped state, a negative voltage signal will be transiently supplied through resistance $R_3$, $R_4$ capacitance $C_2$ and the switch 31 to the auxiliary control circuit so as to rotate the drum 6 in the cable take-up direction.

In case of steering operations, a steering signal will be determined logically from the operating states of the cable angle detecting switches 24 and 25 for detecting the lateral bending of the cable 19 in rightward or leftward direction with respect to the vehicle body and from the operating states of the switches 32 to 35 for detecting the steering operations of the vehicle.

When the vehicle body turns in the rightward direction, the detecting switch 24 comes into contact with the cable 19 and is then closed to become ON with the result that the switches 32 and 35 are closed and the rightward steering detecting signal is then applied to the adding portion 26.

In a case wherein the steering operation of the vehicle is in rightward direction, the cable 19 will tend to further increase its tension but since transient positive voltage +E is applied to the adding portion 26 via an RC series circuit and the switch 32, the cable take-up drum 6 will be rotated in the reverse or opposite direction so as to loosen the cable 19.

When the steering operation of the vehicle is in leftward direction, transient negative voltage −E will similarly be applied to the adding portion 26 via RC series circuit and the switch 35 so as to take up the cable 19 on the drum 6.

When the vehicle body turns in the leftward direction, the detecting switch 25 comes into contact with the cable 19. Similarly, when the steering operation of the vehicle is in leftward direction, transient positive voltage +E will be applied to the adding portion 26 via the switch 33, whereas when the steering operation of the vehicle is in rightward direction, transient negative voltage +E will be applied to the adding portion 26 via the switch 34, so as to correct the cable tension. More particularly, when the vehicle body turns in the rightward direction and the steering operation is in the rightward direction or when the vehicle body turns in the leftward direction and the steering operation is in the leftward direction, the cable 19 will be loosened in advance. On the other hand, when the vehicle body turns in the rightward direction and the steering operation is in the leftward direction or when the vehicle body turns in the leftward direction and the steering operation is in the rightward direction, the switch arrangement produces a signal for taking up the cable 19 in advance.

It should be understood from the foregoing description that since the cable take-up device of this invention provides always constant tension to the cable regardless of the running state of the vehicle, damage to the cable can be obviated and cable skipping caused by abnormal tension of the cable can also be eliminated resulting in prevention of a dangerous condition.

Figure 7A:
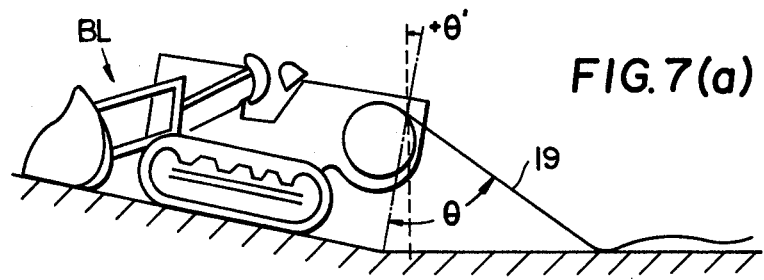
FIG. 7a and 7b is an explanatory view of the operations of the cable take-up device according to this invention.
Figure 7B:
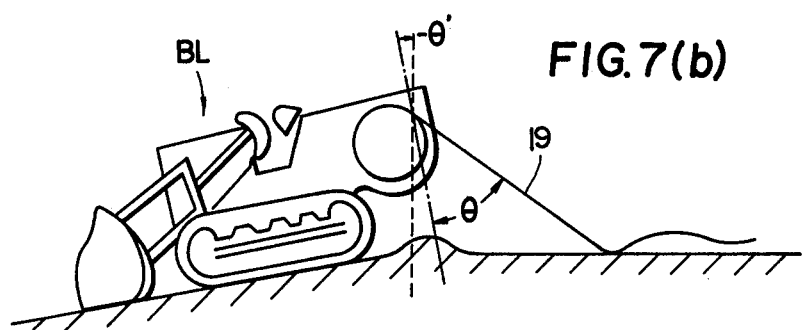

However, in a case wherein the vehicle is inclined in the longitudinal direction thereof such as in forward or reverse direction with respect to the cable take-up device of the above described embodiment of this invention, for example, when the vehicle is inclined in the reverse direction as shown in FIG. 7(a), the cable 19 substantially tends to be slackened with the result that the slack angle $\theta$ of the cable 19 becomes larger than the reference slack angle by an inclination angle $+\theta'$ in comparison with the case where the vehicle is one a level surface. On the other hand, when the vehicle is inclined in the forward direction as shown in FIG. 7(b), the cable 19 substantially tends to be tensioned with the consequence that the slack angle $\theta$ of the cable 19 becomes smaller than the reference slack angle by an inclination angle $-\theta'$ in comparison with the case of the level surface. Thus, some difficulties occur in the control of the slack angle $\theta$ of the cable 19. The following second embodiment of the cable take-up device of this invention has improved control in this respect by detecting the longitudinal inclination of the vehicle so as to correct the set cable slack angle value in such direction that the angle formed between the cable and the vertical plane will approach a predetermined constant value.

Figure 8:
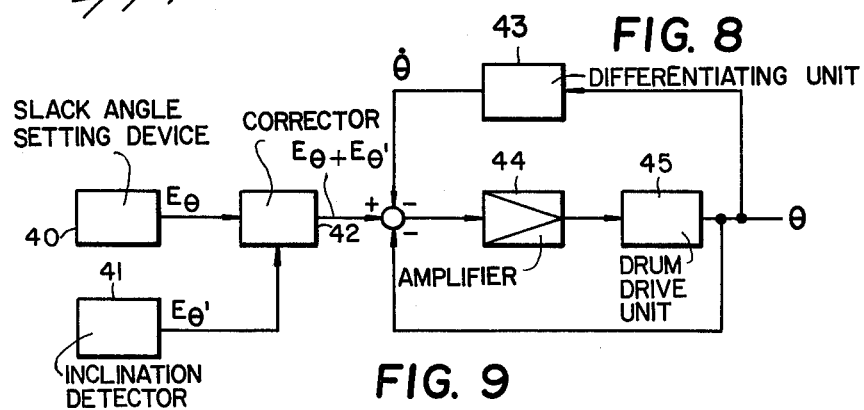
FIG. 8 is a block diagram showing another embodiment of a control device of this invention.

FIG. 8 illustrates a detailed block diagram of another embodiment of the cable take-up control device of this invention.

In FIG. 8, a cable slack angle setting device 40 is provided for producing an output signal $E_\theta$ corresponding to a set slack angle $\theta$ of the cable, and a vehicle body inclination detector 41 is provided for detecting the longitudinal inclination of the vehicle in the forward-reverse direction to produce an output signal $E_\theta'$ corresponding to the inclined angle $\theta'$ of the vehicle body. The output signal voltage $E_\theta$ from the slack angle setting device 40 and the signal voltage $E_\theta'$ from the inclination detector 41 are delivered to a corrector 42 and are added thereat for the corrector 42 to produce its output signal $E_\theta + E_\theta'$, which signal is applied to a drum drive unit 45 via an amplifier 44 so as to control the rotation of the drum 6. This drum drive unit 45 has the aforementioned ignition control circuit 8, the control recitifier 4, the motor 5, the take-up drum 6, etc. so as to control the tension of the cable 19. The output of this drum drive unit 45 is fed back to the amplifier 44 directly and via a differentiating unit 43. The differentiating unit 43 is constructed to increase or enhance the response characteristic of the drum drive unit 45 to the external force and also to aid the stability of the unit 45 as a damping element by producing a signal $E_\theta'$ corresponding to the differentiated value $\dot\theta$ of the slack angle $\theta$ as a feedback signal. When the vehicle is inclined in the longitudinal direction such as in the forward or reverse direction, the set angle $\theta$ is corrected on the basis of the output signal $E_\theta'$ of the inclination detector 41 so as to maintain the tensioned angle of the cable 19 with respect to the vertical plane substantially constant.

The operation of this embodiment of the control device of this invention will now be described with reference to FIGS. 9(a) to 9(c), which show graphs illustrating the relationship between the inclination angle $\theta'$ of the vehicle in the longitudinal direction and the slack angle $\theta$ of the cable relative to the vertical plane.

Figure 9:
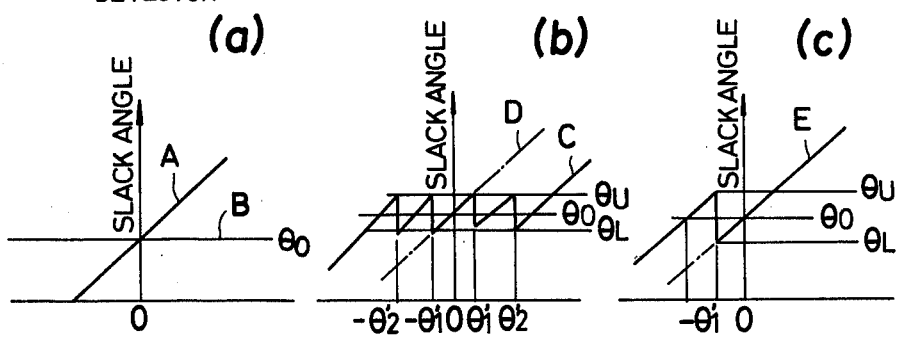
FIG. 9 is a graph for explaining the operation of the device shown in FIG. 8.

FIG. 9(a) shows a case for correcting the slack angle of the cable with an inclinometer so as to always maintain the slack angle with respect to the inclination of the vehicle at the set angle $\theta$ as designated by a rectilinear line B. In a case wherein no correction is necessary, the slack angle will vary as designated by a rectilinear line A.

FIG. 9(b) shows a case wherein four inclination switches are employed in the vehicle. The relationship between the inclination angle of the vehicle and the slack angle of the cable is represented by the polygonal line C and in a case wherein no correction is needed the relationship therebetween is designated by a broken rectilinear line D. More particularly, in a case wherein the vehicle is, for example, inclined in the reverse direction, when the inclination angle of the vehicle becomes $-\theta_1'$, the first inclination switch will operate to correct the slack angle $\theta$ of the cable 19 from $\theta_L$ through standard $\theta_o$ to $\theta_U$ so as to correct the tension of the cable 19. When the vehicle is further inclined in the reverse direction so that the inclination angle of the vehicle becomes $-\theta_2'$, the second inclination switch will operate to again set the slack angle $\theta$ to $\theta_U$ similarly to the above first inclination switch to correct the slack angle of the cable 19 so as to correct the tension of the cable 19.

In a case wherein the vehicle is inclined in the forward direction, when the inclination angle of the vehicle becomes $+\theta_1'$, the first inclination switch will operate to correct the slack angle $\theta$ of the cable 19 from $\theta_L$ through standard $\theta_o$ to $\theta_U$ so as to correct the tension of the cable 19. When the vehicle is further inclined in the forward direction so that the inclined angle of the vehicle becomes $+\theta_2'$, the second inclination switch will operate to again set the slack angle $\theta$ to $\theta_U$ so as to correct the slack angle of the cable 19.

Thus, in a case wherein the inclination switches are used, the slack angle of the cable 19 is adapted to be corrected to $\theta_U$ slightly larger than the standard set angle $\theta_o$ to correct it in a sawtooth wave manner with respect to the inclination of the vehicle so as to effectively correct it in a wide range of inclination.

It will be appreciated that if the number of the inclination switches is increased, the slack angle of the cable 19 can be accurately corrected for a wide range of the inclination of the vehicle.

FIG. 9(c) shows a case wherein one inclination switch is used in the vehicle. The reslationship between the inclination angle of the vehicle and the slack angle of the cable is indicated by a zigzag line E. When only one inclination switch is thus used in the control device, the switch should preferably be adapted to operate in a case of reverse inclination of the vehicle. It should also be understood that the inclination switch may equivalently be operated in case of the forward inclination of the vehicle.

Figure 10:
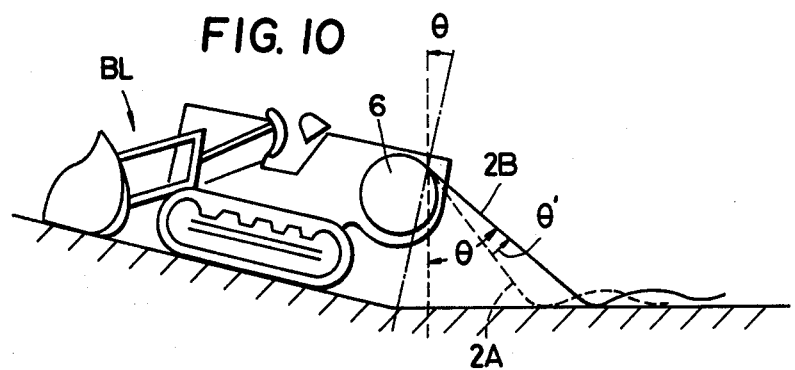
FIG. 10 is an explanatory view of the operation of the device shown in FIG. 8.

FIG. 10 shows a case wherein the slack angle of the cable is corrected by one inclination switch when the vehicle is inclined in the reverse direction. As shown in FIG. 9(c), when the inclination angle of the vehicle become $-\theta_1'$, the inclination switch will operate to correct the slack angle of the cable 19 from $\theta_L$ through the standard slack angle $\theta_o$ to $\theta_U$. Accordingly, as shown in FIG. 10, the cable 19 is corrected from the position 2A (broken line) to the position 2B (solid line). Thus, the cable 19 can be orderly wound on the drum 6 without slackness and looseness.

It is noted that although the slack angle of the cable is not corrected when the vehicle is inclined in the forward direction in the case of one inclination switch employed therein, no serious inconvenience will take place even if some degree of tension is applied to the cable 19.

Figure 11:
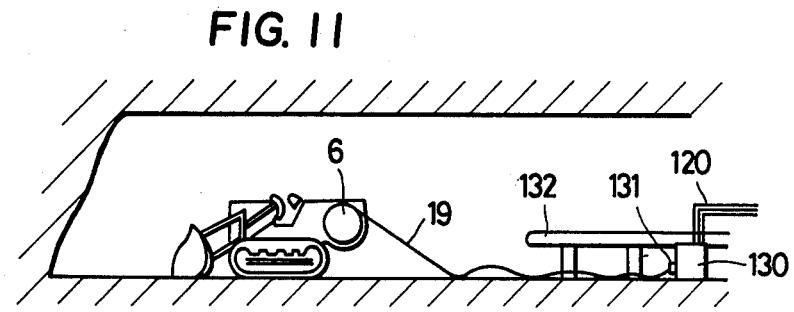
FIGS. 11 and 12 are explanatory views showing concrete working examples of the vehicle equipped with this invention.

FIG. 11 shows a schematic side view of a specific working example of the vehicle to which the cable take-up device of this invention is applied, in which the working of the vehicle is conducted underground such as in a tunnel. The electric power to be applied to the vehicle is supplied through a feeder cable 120 from above underground to a transformer 130, which transforms the external power to the necessary voltage for the vehicle. the transformed voltage is applied through a connector 131, a cable 19 and a cable take-up drum 6 to the vehicle. The vehicle is driven by the electric power thus applied through the cable 19 so as to work as desired, and the soil thus dug by the vehicle, should it be a bulldozer, is carried out through a conveyor 132 or other vehicle (not shown) to the exterior of the underground.

Figure 12:
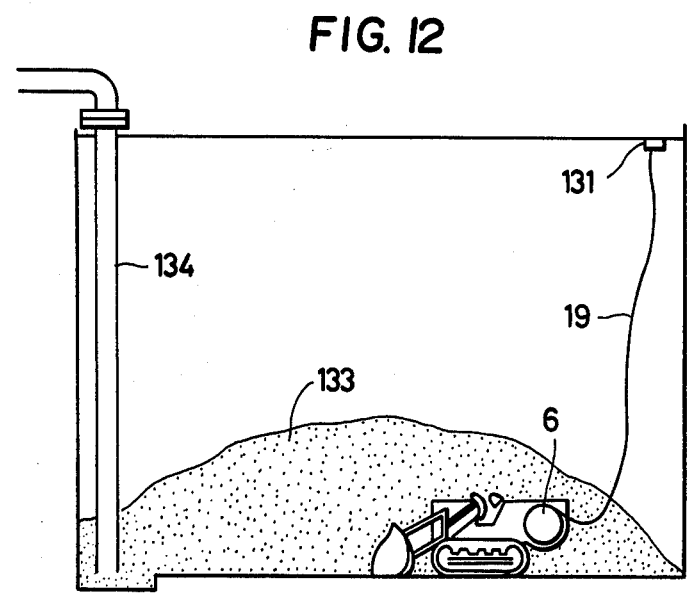

FIG. 12 shows a schematic side view of a loading and unloading example of the vehicle below decks in a vessel, such as one carrying bulk grain 133 to be unloaded by being bulldozed to the inlet port of a suction pipe 134 through which the bulk grain 133 is transported. In this case, the electric power to be applied to the vehicle is supplied through the cable 19 wound on the drum 6 from the connector 131 provided at the overhead or bulkhead of the deck being worked. The slackness of the cable 19 is controlled by the drum 6 in a suspended state.

It should also be understood from the foregoing description that the cable take-up device of this invention can thus control the tension of the cable not only when the cable 19 is located on the ground but when it is hung from above.

What is claimed is:

1. A cable take-up device for an electric drive vehicle supplied with electric power through a cable, said device comprising a cable drum rotatable in opposite directions for taking up and unwinding the cable; a reversible DC motor for driving the drum in its cable taking up and unwinding directions; detecting means for electrically detecting slackening, i.e. a slack angle, of said cable, said detecting means including a movable bar arranged to contact said cable and follow the slackening thereof and a transducer actuated by said movable bar to produce a slack angle signal representing the instantaneous magnitude of said slack angle; a slack angle setting device for producing a reference signal representing a preset magnitude of said slack angle; deviation signal generating means responsive to the signals produced by said transducer and slack angle setting device for generating a deviation signal representing the magnitude and sense of any deviation in magnitude of the instantaneous slack angle from the preset slack angle; and control means for controlling said DC motor in response to said deviation signal so as to minimize said deviation signal and thereby maintain the slack angle of the cable substantially constant at said preset magnitude thereof.

2. A cable take-up device according to claim 1, further comprising transient signal generating means responsive to the forward-reverse position of a speed change gear shift lever of said vehicle for generating transient signals of positive and negative polarities at a time only when the forward-reverse position is switched, and means for adding said transient signals to said slack angle signal so as to temporarily modify the slack angle signal and thereby cause said DC motor to be controlled to perform cable unwinding and take-up operations, respectively, immediately upon said gear shift lever being switched to its forward and reverse positions when the vehicle is stopped.

3. A cable take-up device according to claim 1, further comprising a plurality of steering operation detecting switches responsive to rightward and leftward steering operations of the vehicle, and cable lateral movement detecting switches for operating when the cable forms an angle in a lateral direction with respect to the drum, said switches being arranged to add a transient signal of positive polarity to said slack angle signal when the direction of the steering operation is the same as the direction of the lateral movement of the cable relative to the drum, whereas a transient signal of negative polarity is added to said slack signal when the direction of the steering operation is not the same as the direction of the lateral movement of the cable, whereby said DC motor is caused, respectively, to unwind and take up said cable immediately upon said slack angle signal being modified by said transient signals of positive and negative polarity.

4. A cable take-up device according to claim 1, which further comprises guide roller means provided above said drum for guiding the cable, and a screw having dual threads for displacing said guide roller when rotated at a predetermined speed corresponding to rotation of said drum, said guide roller upon being moved to one end of said drum then being moved toward the other end of said drum thereby to wind the cable on said drum.

5. A cable take-up device for an electric drive vehicle supplied with electric power through a cable, said device comprising a motor for driving a drum for taking up the cable, a detector for electrically detecting slackening, i.e. a slack angle, of said cable and producing a signal representing the detected slack angle value, which detector includes a bar in contact with said cable and is movable to follow slackening of said cable and a potentiometer having a slider movable in association with said bar, slack angle setting means for generating a signal representing a preset slack angle value, a vehicle inclination angle detector for electrically detecting the inclination angle of the vehicle with respect to the longitudinal direction of the vehicle and producing a signal representing the detected inclination angle value, a corrector for correcting the preset slack angle signal by the detected inclination angle signal, and control means responsive to the difference between the detected slack angle signal and the corrected preset slack angle signal for controlling the motor so that the taking up and unwinding of the cable are controlled by driving said drum in the direction that the slack angle of the cable will approach said corrected preset value.

6. A cable take-up device according to claim 5, wherein said control means include a differentiating circuit which differentiates the detected slack angle signal, said motor being controlled by a signal representing the difference between the corrected preset slack angle signal and the sum of the detected slack angle signal and its differential outputted from said differentiating circuit.

7. The cable take-up device according to claim 5 wherein at least two vehicle inclination angle detectors are used for detecting the longitudinal inclination of the vehicle body, each thereby controlling in response to the inclination of the vehicle body the slack angle of the cable through a predetermined range of cable slack angle.

* * * * *